US011781021B2

(12) United States Patent
Terwillegar

(10) Patent No.: US 11,781,021 B2
(45) Date of Patent: *Oct. 10, 2023

(54) DICYCLOPENTADIENE MODIFIED ESTER OLIGOMERS USEFUL IN CORROSION RESISTANT COATINGS

(71) Applicant: PTT Global Chemical Public Company Limited, Bangkok (TH)

(72) Inventor: Arne Matthew Terwillegar, Kernersville, NC (US)

(73) Assignee: PTT Global Chemical Public Company Limited, Bangkok (TH)

( * ) Notice: Subject to any disclaimer, the term of this patent is extended or adjusted under 35 U.S.C. 154(b) by 808 days.

This patent is subject to a terminal disclaimer.

(21) Appl. No.: 16/627,836

(22) PCT Filed: Jun. 21, 2018

(86) PCT No.: PCT/US2018/038682
§ 371 (c)(1),
(2) Date: Dec. 31, 2019

(87) PCT Pub. No.: WO2019/010006
PCT Pub. Date: Jan. 10, 2019

(65) Prior Publication Data
US 2020/0239706 A1    Jul. 30, 2020

Related U.S. Application Data

(60) Provisional application No. 62/528,088, filed on Jul. 1, 2017.

(51) Int. Cl.
| | | |
|---|---|---|
| C09D 5/08 | (2006.01) | |
| C09D 7/65 | (2018.01) | |
| C08F 290/06 | (2006.01) | |
| C08G 18/62 | (2006.01) | |
| C09D 4/06 | (2006.01) | |
| C08G 18/67 | (2006.01) | |
| C08G 18/68 | (2006.01) | |
| C08G 18/75 | (2006.01) | |
| C08G 63/553 | (2006.01) | |
| C09D 151/08 | (2006.01) | |
| C09D 167/06 | (2006.01) | |
| C09D 175/16 | (2006.01) | |

(52) U.S. Cl.
CPC ............ *C09D 5/08* (2013.01); *C08F 290/061* (2013.01); *C08G 18/672* (2013.01); *C08G 18/683* (2013.01); *C08G 18/755* (2013.01); *C08G 63/553* (2013.01); *C09D 4/06* (2013.01); *C09D 7/65* (2018.01); *C09D 151/08* (2013.01); *C09D 167/06* (2013.01); *C09D 175/16* (2013.01)

(58) Field of Classification Search
CPC ... C09D 5/08; C09D 4/06; C09D 7/65; C09D 151/08; C09D 167/06; C09D 175/16; C09D 175/14; C08F 290/061; C08F 220/283; C08G 18/672; C08G 18/683; C08G 18/755; C08G 63/553; C08K 3/08
See application file for complete search history.

(56) References Cited

U.S. PATENT DOCUMENTS

| | | |
|---|---|---|
| 6,541,535 B1 | 4/2003 | Blum et al. |
| 2012/0027974 A1 | 2/2012 | Skillman et al. |
| 2013/0211001 A1 | 8/2013 | Skillman et al. |
| 2014/0138393 A1 | 5/2014 | Skillman et al. |
| 2015/0175839 A1 | 6/2015 | Skillman et al. |
| 2016/0264722 A1 | 9/2016 | Skillman et al. |
| 2017/0335056 A1 | 11/2017 | Skillman et al. |

FOREIGN PATENT DOCUMENTS

| | | |
|---|---|---|
| WO | WO 2010/118356 A1 | 10/2010 |
| WO | WO 2017/112680 A1 | 6/2017 |

OTHER PUBLICATIONS

Kawabata et al., machine English translation of JP 2003-089709 (Year: 2003).*
International Search Report dated Aug. 24, 2018 in PCT/US2018/038682 filed on Jun. 21, 2018.

\* cited by examiner

*Primary Examiner* — Jessica M Roswell
(74) *Attorney, Agent, or Firm* — Oblon, McClelland, Maier & Neustadt, L.L.P.

(57) ABSTRACT

Corrosion resistance coatings and dicyclopentadiene modified ester oligomers useful in corrosion resistant coatings. The corrosion resistant coatings exhibit improved corrosion resistance, improved adhesion, lower toxicity, unlimited pot life, and/or lower volatile organic compounds (VOCs).

11 Claims, 3 Drawing Sheets

DICYCLOPENTADIENE MODIFIED ESTER OLIGOMERS USEFUL IN CORROSION RESISTANT COATINGS

CROSS-REFERENCE TO RELATED APPLICATIONS

This application claims priority to U.S. Provisional Patent Application No. 62/528,088 filed Jul. 1, 2017.

STATEMENT REGARDING FEDERALLY SPONSORED RESEARCH OR DEVELOPMENT

Not Applicable.

JOINT RESEARCH AGREEMENT

Not applicable.

BACKGROUND OF INVENTION

The invention relates to the field of corrosion resistant coatings. More specifically, the invention relates to ester or urethane DCPD modified oligomers useful in corrosion resistant coatings applications. In some applications, the corrosion resistant coatings are curable to a surface by oxidative curing.

Current chemistries used in corrosion resistant coatings include alkyd resins, acrylics, two-component urethanes, two-component epoxies, and combinations thereof. Alkyd resins and acrylics are inexpensive but exhibit poor corrosion resistance and/or poor adhesion and will degrade upon exposure to corrosive environments such as prolonged ultraviolet (UV) light from the sun and catalyzed hydrolysis from salt water and will also delaminate. Two-component urethanes and epoxies exhibit better corrosion resistance and adhesion than alkyd resins and acrylics, however, they require toxic curing agents, are difficult to apply, and have limited pot lives. Combining current chemistries allow for better control of properties, however there is an inevitable trade-off that renders the overall performance lacking. In addition, many of the current chemistries require copious amounts of solvent to obtain a workable viscosity and, as such, produce hazardous volatile organic compounds (VOCs).

There has also been a growing interest in developing polymer resins useful in coating applications. U.S. Pat. Nos. 3,166,434; 3,340,327; and 3,399,153, all assigned to Desoto Inc., disclose dicyclopentadiene and cyclopentadiene modified polyester resins. U.S. Pat. No. 3,347,806, assigned to Chemische Werke, discloses a dicyclopentadiene modified unsaturated polyesters and process for preparing them. U.S. Pat. No. 3,448,066, assigned to PPG Industries, Inc., discloses air drying of unsaturated polyester resins prepared from polyol, an adduct of cyclopentadiene and a dicarboxylic acid. U.S. Pat. Nos. 3,883,612 and 3,933,757, both assigned to SCM Corporation, disclose dicyclopentadiene modified polyester resins. U.S. Pat. Nos. 4,029,848; 4,148,765; 4,167,542; 4,348,499; 4,360,647; 4,435,530; 4,443,580; 4,496,688; and 4,540,829, all assigned to Dow Chemical Company, disclose dicyclopentadiene and/or cyclopentadiene modified ester oligomers. U.S. Pat. No. 4,233,432, assigned to United States Steel Corporation, discloses a method of preparing unsaturated polyester resins containing high amounts of dicyclopentadiene. U.S. Pat. No. 4,322,504, assigned to Hoechest Aktiengesellschaft, discloses a resin binder containing a norbornane ring system. U.S. Pat. No. 4,332,931, assigned to Takeda Chemical Industries, Ltd., discloses unsaturated polyester produced by reacting dicarboxylic acid anhydride with alkylene oxide in the presence of a reaction product of dicarboxylic acid and dicyclopentadiene. U.S. Pat. Nos. 4,522,977; 4,522,978; 4,532,296; 4,532,297; and 4,626,570, all assigned to Union Carbide Corporation, disclose dicyclopentadiene and/or cyclopentadiene modified ester oligomers. U.S. Pat. No. 4,525,427, assigned to The Alpha Corporation, discloses polyester composition modified with dicyclopentadiene. U.S. Pat. Nos. 5,770,653 and 6,384,151, both assigned to Nippon Shokubai Co., Ltd., disclose dicyclopentadiene modified polyester resins. U.S. Pat. Nos. 6,288,146; 6,632,481; and 6,803,393, all assigned to BASF Aktiengesellschaft, disclose binder composition comprising dicyclopentadiene or its derivatives. U.S. Pat. No. 6,515,071, assigned to Ashland Inc., discloses a process for the preparation of dicyclopentadiene modified unsaturated polyester.

For the foregoing reasons, there is a need for corrosion resistant coatings that overcome the existing problems and limitations in the art.

SUMMARY OF INVENTION

The invention covers coating compositions comprising dicyclopentadiene modified ester oligomers (DMEO) that are curable to a surface by oxidative curing, dicyclopentadiene modified ester urethane oligomers (DMEUO) useful in coating compositions, and coating compositions comprising dicyclopentadiene modified ester urethane oligomers that are curable to a surface by oxidative curing.

The invention provides many advantages over the existing art, including improved corrosion resistance, improved adhesion, lower toxicity, unlimited pot life, and lower volatile organic compounds (VOCs). Typical alkyd resins exhibit mediocre protection against corrosion. In order to get superior protection, one must switch to more expensive urethanes or epoxies. The invention offers superior corrosion resistance coupled with lower cost and ease of use. Regardless of how well a coating protects against corrosion, if the adhesion is inadequate the corrosive atmosphere can simply infiltrate underneath the coating and attack the metal, thereby causing delamination. The invention exhibits superior adhesion. Current technologies for high performance applications require two-component systems and toxic curing agents such as isocyanates for polyurethane and amines for epoxies. The invention requires no toxic curing agents. Another shortcoming of two-component systems is the pot life phenomena. Once the toxic curing agent is added, the mixing pot will eventually harden. What is not used must be wasted or the associated equipment will be ruined. When using the one-component system described herein, the pot life is practically infinite, assuming that the material is kept away from sunlight. Alkyd resins, polyurethanes and epoxies usually require copious amounts of solvent in order to apply effectively due to the higher viscosities of the polymers. The invention utilizes reactive monomers as diluents, thereby greatly reducing the amount of solvent required, and sometimes eliminating solvents altogether.

Unless otherwise defined, all terms used herein have the same meaning as commonly understood by one of ordinary skill in the art to which the invention pertains. All publications, patent applications, patents, and other references mentioned herein are incorporated by reference in their entirety. In case of conflict, the specification, including definitions, will control. The materials, methods, examples, and drawings included herein are illustrative only and not intended to be limiting.

DEFINITIONS

Figure 1:
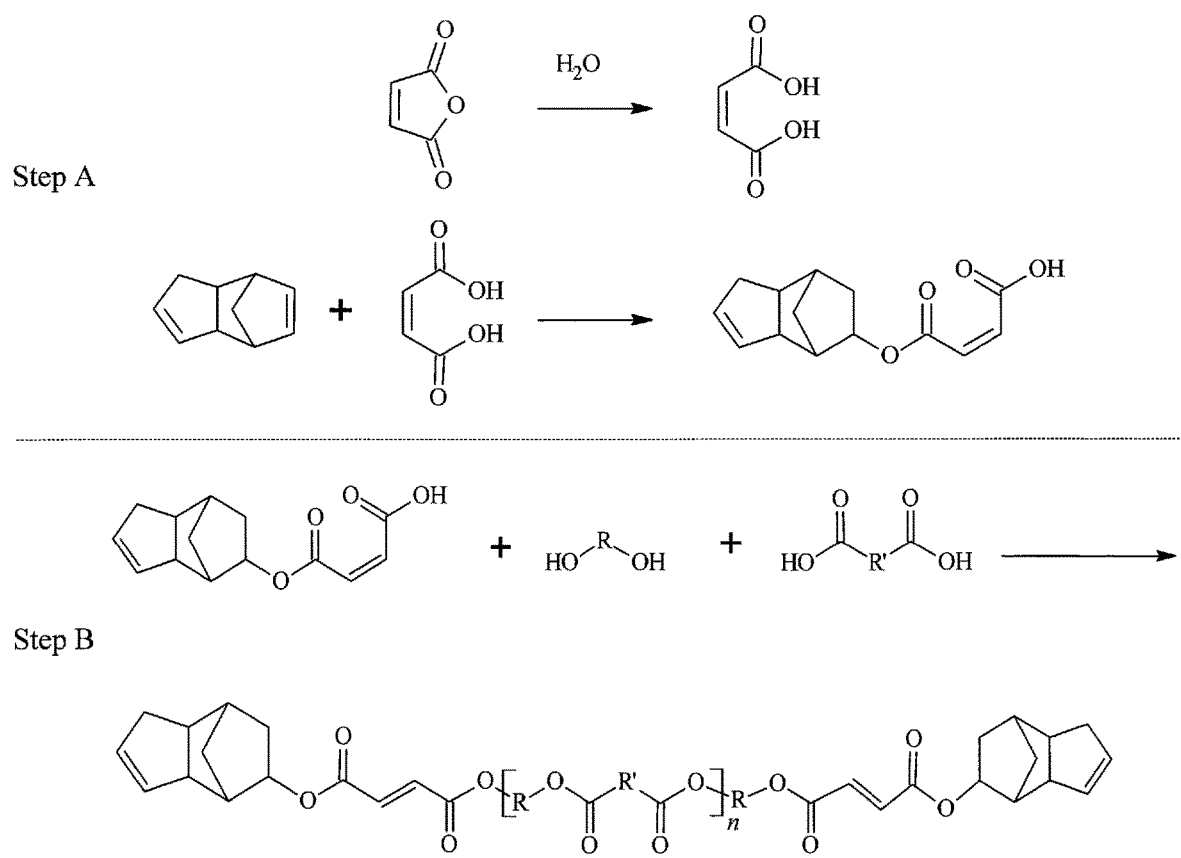
FIG. 1 is a diagram depicting a generic two-step process for preparing dicyclopentadiene modified ester oligomers. In step A, maleic anhydride is reacted with water to yield maleic acid which then reacts with dicyclopentadiene to produce maleic acid-dicyclopentadiene half-ester. In step B, the maleic acid-dicyclopentadiene half-ester is reacted with one or more diols and optionally one or more dicarboxylic acids to yield dicyclopentadiene modified ester oligomers. R is a hydrocarbon that comprises 1 to 20 carbon atoms, preferably 3 to 8 carbon atoms. R' is a hydrocarbon that comprises 1 to 20 carbon atoms, preferably 3 to 8 carbon atoms. n is 0 to 10, preferably 0 to 3.
Figure 2:
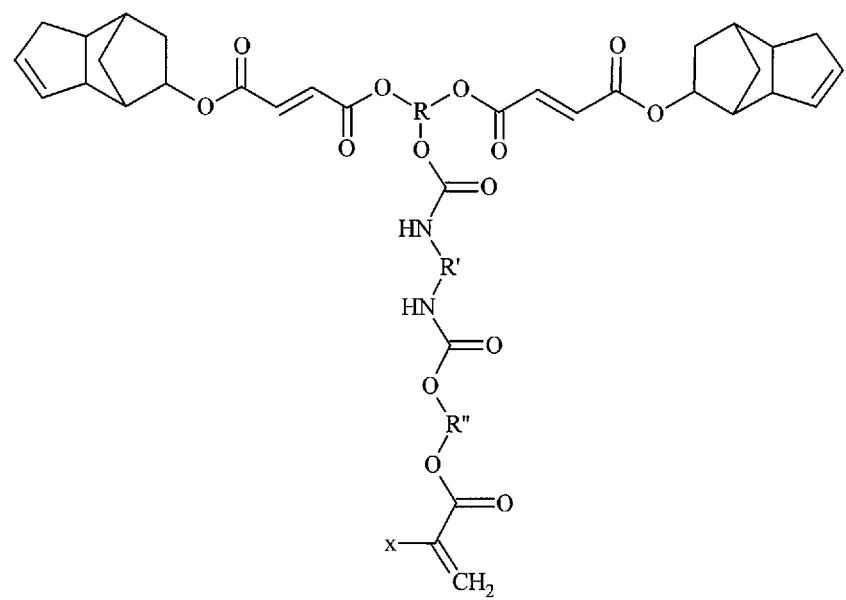
FIG. 2 is a diagram depicting the generic formula for a dicyclopentadiene modified ester urethane oligomer. R is a hydrocarbon that comprises 1 to 20 carbon atoms, preferably 3 to 8 carbon atoms. R' is a hydrocarbon that comprises 1 to 20 carbon atoms, preferably 8 to 12 carbon atoms. R" is a hydrocarbon that comprises 1 to 20 carbon atoms, preferably 1 to 3 carbon atoms. x is $CH_3$ or H.
Figure 3:
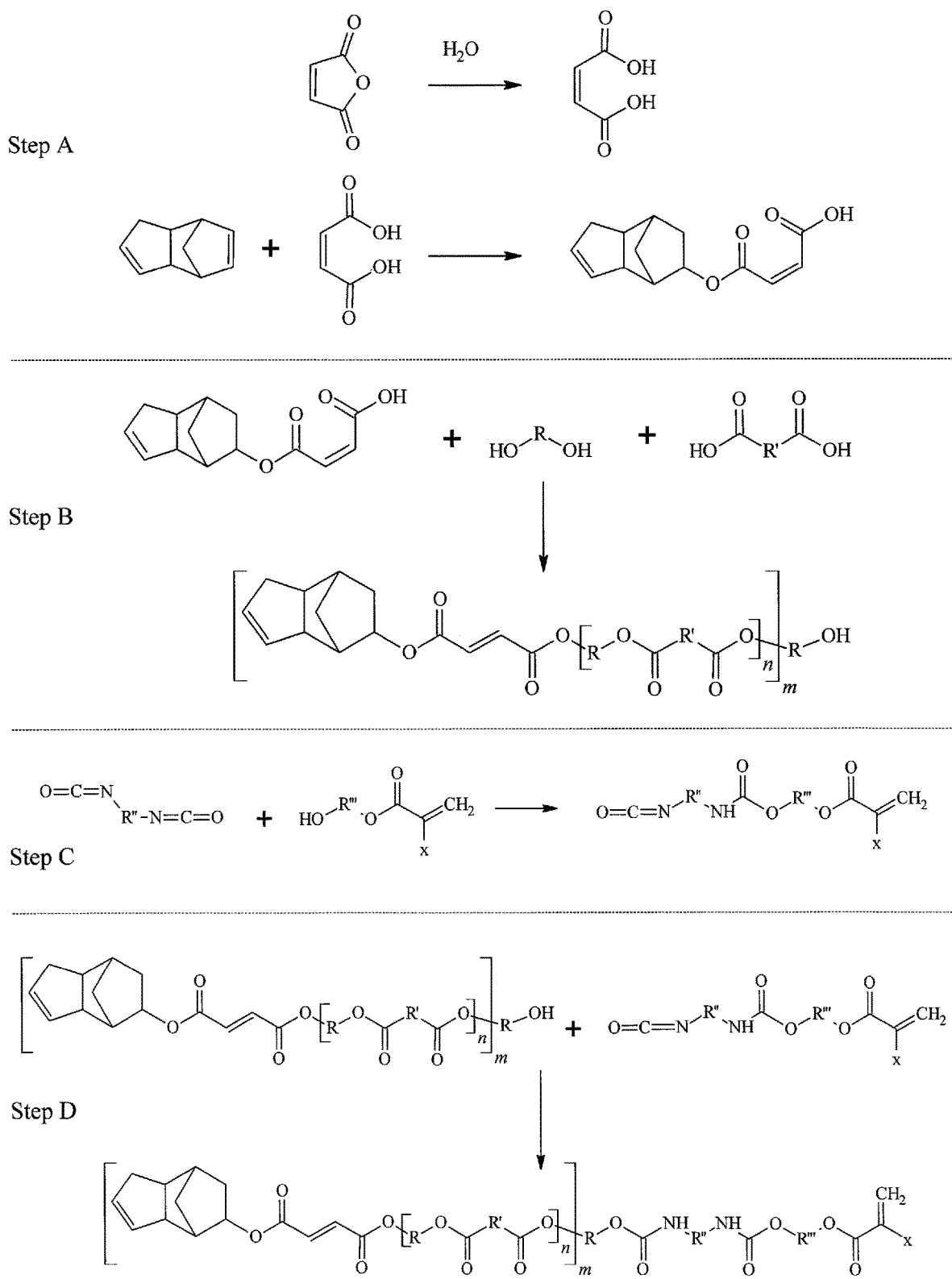
FIG. 3 is a diagram depicting a generic four-step process for preparing dicyclopentadiene modified polyester urethane oligomers. In step A, maleic anhydride is reacted with water to yield maleic acid which then reacts with dicyclopentadiene to produce maleic acid-dicyclopentadiene half-ester. In step B, the maleic acid-dicyclopentadiene half-ester is reacted with one or more diols and one or more dicarboxylic acids to yield a hydroxy functional dicyclopentadiene modified ester oligomers. In step C, a hydroxy functional acrylate monomer is added to a diisocyanate at elevated temperature. In step D, the hydroxy functional dicyclopentadiene modified ester oligomer is added to the acrylated diisocyanate of step C. R is a hydrocarbon that comprises 1 to 20 carbon atoms, preferably 3 to 8 carbon atoms. R' is a hydrocarbon that comprises 1 to 20 carbon atoms, preferably 3 to 8 carbon atoms. R" is a hydrocarbon that comprises 1 to 20 carbon atoms, preferably 6 to 12 carbon atoms. R'" is a hydrocarbon that comprises 1 to 5 carbon atoms, preferably 1 to 3 carbon atoms. n is 0 to 10, preferably 0 to 3. m is 1 or 2.

To facilitate understanding of the invention, a number of terms are defined herein.

The term "oxidative curing" means the re-association of π electrons inherent in carbon-carbon double bonds to produce a cross-linked network via a peroxide-initiated mechanism and/or an oxygen gas-initiated mechanism. Examples of oxidative curing include but are not limited to peroxide-initiated curing of a fiberglass resin and air-drying of an alkyd resin.

The term "thermal curing" means the re-association of π electrons inherent in carbon-carbon double bonds to produce a cross-linked network via a heat-initiated mechanism. An example of thermal curing includes but is not limited to an oven-curing of a resin.

The term "metal drier" means a ligand of a common inorganic metal. Metal driers include but are not limited to organic salts of cobalt, organic salts of zirconium, and organic salts of calcium.

DESCRIPTION OF INVENTION

In one embodiment, the coating composition comprises a dicyclopentadiene modified ester oligomer mixed with an ethylenically unsaturated monomer, a metal dryer, and a solvent. The ethylenically unsaturated monomer can be trimethylolpropane trimethacrylate (TMPTMA), trimethylolpropane triacrylate (TMPTA), triethyleneglycol dimethacrylate (TRGDMA), monoacryloxyethyl succinate (MAES), or a combination of TMPTA and TRGDMA. The metal dryer can be cobalt, zirconium, or calcium, or preferably all three. The solvent can be methyl ethyl ketone (MEK), toluene, or both. In another embodiment, a flow additive can be used.

In another embodiment, the dicyclopentadiene modified ester urethane oligomer is comprised of hydroxy-functional dicyclopentadiene ester oligomer (HDEO), an isocyanate, and a hydroxy-functional acrylate monomer (HAM). HDEOs are formed by reacting dicyclopentadiene, water, maleic anhydride, one or more glycols, and one or more monofunctional epoxide monomers. The one or more glycols includes but is not limited to 1,6 hexanediol (HDO); 1,4 butanediol (BDO); pentaerythrtiol; neopentyl glycol (NPG); diethylene glycol (DEG), triethylene glycol; tetraetheylene glycol; 1,2 propanediol (PG); 1,3-propanediol (PDO); glycerine; and 2-methyl, 1,3-propanediol (MPD); and trimethylol propane (TMP). The one or more monofunctional epoxide monomers includes but is not limited to C12-C14 aliphatic monoglycidyl ether, 2-ethylhexyl glycidyl ether, cresyl glycidyl ether, para-tert butylphenol glycidyl ether, and glycidyl neodecaneoate. Isocyanate includes but is not limited to aliphatic monomeric or polymeric diisocyanates such as isophorone diisocyanate (IPDI), methylene dicyclohexyl diisocyanate (HMDI), and hexamethylene diisocyanate (HDI) and trimers thereof, and aromatic monomeric or polymeric diisocyanates such as 2,4-2,6 toluene diisocyanate (TDI), diphenylmethane diisocyanates (MDI), and trimers thereof. HAM includes but is not limited to hydroxy ethyl acrylate, hydroxy methyl acrylate, hydroxy propyl acrylate, hydroxy propyl methacrylate, and ethoxylated or propoxylated versions thereof. In a preferred embodiment, the HDEO is 2,5-furandione, polymer with 2-ethyl-2-(hydroxymethyl)-1,3-propanediol, 3a,4,5,6,7,7a-hexahydro-4,7-methano-1H-inden-5(or 6)-yl ester, ester with 2,3-dihydroxypropyl neodecanoate, which is the reaction product of dicyclopentadiene, water, maleic anhydride, trimethylolpropane, and glycidyl neodecaneoate; the isocyanate is isophorone diisocyanate; and the HAM is hydroxy ethyl acrylate.

In another embodiment, the HDEOs are formed by reacting dicyclopentadiene, water, maleic anhydride, one or more glycols, one or more monofunctional epoxide monomers, and one or more dicarboxylic acids. The one or more dicarboxylic acids includes but is not limited to succinic acid, adipic acid, azelaic acid, terephthalic acid, isophthalic acid, orthophthalic anhydride, dodecanedioc acid, and methyl esters thereof.

In another embodiment, the coating composition comprises a dicyclopentadiene modified ester urethane oligomer mixed with an ethylenically unsaturated monomer, a metal dryer, and a solvent. The ethylenically unsaturated monomer can be trimethylolpropane trimethacrylate (TMPTMA), trimethylolpropane triacrylate (TMPTA), triethyleneglycol dimethacrylate (TRGDMA), monoacryloxyethyl succinate (MAES), or a combination of TMPTA and TRGDMA. The metal dryer can be cobalt, zirconium, or calcium, or preferably all three. The solvent can be methyl ethyl ketone (MEK), toluene, or both. In another embodiment, a flow additive can be used.

The coating compositions can be cured to a surface by oxidative curing or thermal curing. The coating compositions can be applied to a variety of surfaces including but not limited to metal, concrete, wood, plastic, ceramic, textile, leather, paper, rubber, and glass to improve the corrosion resistance of the surface. The method for applying the coating compositions includes but is not limited to spraying, roll coating, curtain coating, and smoothing with a smoothing device such as a bird bar or Meyer rod. The method for applying can be manual, automated, or a combination thereof.

The optimal final thickness of the applied coating composition varies depending on, without limitation, the surface, the contour of the surface, the formula of the coating composition, the solvent content (if any), and the means of curing. A typical final thickness of the applied coating composition is less than or equal to 100 mils (2.54 mm), but can vary depending on the previously mentioned factors.

The cured coating compositions can be evaluated using techniques well-known in the art. Although the degree of curing is easily measured through certain qualitative methods such as fingernail marring or film integrity after thumb twist, a number a quantitative measures of curing efficiency are possible. For example, the measurement of disappearance of acrylate carbon-carbon double bonds at 1636 cm$^{-1}$ using Fourier transform infrared spectroscopy is the gold standard in assessing the curing efficiency. Similar techniques can be applied to measure the disappearance of maleate carbon-carbon double bonds and allylic carbon-carbon double bonds at varying cm−1 ranges. In addition, a number of other quantitative tests such as cross-hatch adhesion, tape adhesion, flexibility, hardness, and impact resistance can be used to quantify the curing efficiency and the suitability of the coating compositions.

In all embodiments, the dicyclopentadiene modified ester oligomer and/or dicyclopentadiene modified ester urethane oligomer can be made without solvent.

EXAMPLES

Example 1

Synthesis of Dicyclopentadiene Modified Ester Oligomers

Six batches of dicyclopentadiene modified ester oligomers were synthesized.

Batch 1 was prepared by adding 846 g of dicyclopentadiene (Sigma Aldrich, St. Louis, Missouri, USA) to 121 g of water under nitrogen and heating the mixture to 80° C. 627 g of maleic anhydride (Sigma Aldrich, St. Louis, Missouri, USA) was gradually added to the mixture of dicyclopentadiene and water under nitrogen and was held at 125° C. for 2 hours. At the end of the 2-hour incubation, 486 g of 1,3-propanediol (DuPont, Wilmington, Delaware, USA), 378 g of succinic acid (Myriant, Woburn, Massachusetts, USA or Kawasaki Kasei Chemicals, Kawasaki City, Kanagawa, Japan), and 43 g of trimethylol propane (Alfa Aesar, Haverhill, Massachusetts, USA) were added and gradually heated to 205° C. The final acid value was 24.7 mg KOH/g of sample.

Batch 2 was prepared by adding 1010 g of dicyclopentadiene to 44 g of water under nitrogen and heating the mixture to 80° C. 747 g of maleic anhydride (Sigma Aldrich, St. Louis, Missouri, USA) was gradually added to the mixture of dicyclopentadiene and water under nitrogen and was held at 125° C. for 2 hours. At the end of the 2-hour incubation, 619 g of 1,3-propanediol, 378 g of succinic acid, and 43 g of trimethylol propane were added and gradually heated to 205° C. The final acid value was 5.6 mg KOH/g of sample. This batch contained hydroxy functional groups suitable for urethane synthesis.

Batch 3 was prepared by adding 140 g of dicyclopentadiene to 20 g of water under nitrogen and heating this mixture to 80° C. 104 g of maleic anhydride was gradually added to the mixture of dicyclopentadiene and water under nitrogen and was held at 125° C. for 2 hours. At the end of 2-hour incubation, 69 g of ethylene glycol (Sigma Aldrich, St. Louis, Missouri, USA), 63 g of succinic acid, and 7 g of trimethylol propane were added and gradually heated to 205° C. The final acid value was 24.1 mg KOH/g of sample.

Batch 4 was prepared by adding 126 g of dicyclopentadiene to 18 g of water under nitrogen and heating this mixture to 80° C. 93 g of maleic anhydride was gradually added to the mixture of dicyclopentadiene and water under nitrogen and was held at 125° C. for 2 hours. At the end of 2-hour incubation, 101 g of diethylene glycol (SABIC, Riyadh, Saudi Arabia), 56 g of succinic acid, and 6 g of trimethylol propane were added and gradually heated to 205° C. The final acid value was 24.9 mg KOH/g of sample.

Batch 5 was prepared by adding 133 g of dicyclopentadiene to 19 g of water under nitrogen and heating this mixture to 80° C. 103 g of maleic anhydride was gradually added to the mixture of dicyclopentadiene and water under nitrogen and was held at 125° C. for 2 hours. At the end of 2-hour incubation, 90 g of 1,4-butanediol (Sigma Aldrich, St. Louis, Missouri, USA), 59 g of succinic acid, and 7 g of trimethylol propane were added and gradually heated to 205° C. The final acid value was 25.0 mg KOH/g of sample.

Batch 6 was prepared by adding 135 g of dicyclopentadiene to 19 g of water under nitrogen and heating this mixture to 80° C. 97 g of maleic anhydride was gradually added to the mixture of dicyclopentadiene and water under nitrogen and was held at 125° C. for 2 hours. At the end of 2-hour incubation, 79 g of 1,3-propanediol, 73 g of adipic acid (Sigma Aldrich, St. Louis, Missouri, USA), and 7 g of trimethylol propane were added and gradually heated to 205° C. The final acid value was 25.5 mg KOH/g of sample.

Example 2

Mixing of Coating Composition Containing Dicyclopentadiene Modified Ester Oligomers In a mixing cup, the polyester dicyclopentadiene oligomer was warmed to 60° C. with the appropriate monomer(s). The mixture was then stirred with mechanical agitation until homogenous. If necessary, the entire mixture was re-warmed and re-agitated until 100% homogeneous.

Example 3

Synthesis of Dicyclopentadiene Modified Ester Urethane Oligomers

To a 1 L reaction flask equipped with nitrogen blanket, agitation, temperature control and a condenser, 312 g of DCPD and 45 g of water were charged and warmed to 80° C. To this 232 g of maleic anhydride was added slowly in order to control exotherm under 125° C. Once all maleic was added, 211 g of trimethylol propane was added and heated to 205° C. The reaction was held until the acid value was measured to be 13.0 mg KOH/g of sample. Subsequently, the reactor was cooled to 120° C. and 46 g glycidyl neodecanoate was added. The reactor was held at 120° C.

until the acid value was 0.5 mg KOH/g of sample. The final hydroxyl value was measured to be 142.8 mg KOH/g of sample.

Subsequently, in a 1 L reaction flask equipped with a dry air sparge, agitation, a condenser and a drop funnel, 96 g IPDI was charged to said flask and warmed to 70° C. To this, 50 g of hydroxy ethyl acrylate was added slowly to control exotherm. Finally, 168 g of the reaction product in the previous paragraph as well as 135 g of isobornyl acrylate were added. The reaction was allowed to proceed to completion under agitation and heat.

To a 3 L reaction flask equipped with nitrogen blanket, agitation, temperature control and a condenser, 1008 g of DCPD and 145 g of water were charged and warmed to 80° C. To this 748 g of maleic anhydride was added slowly in order to control exotherm under 125° C. Once all maleic was added, 617 g of 1,3-propanediol was added and heated to 205° C. The reaction was held until the acid value was measured to be 3.2 mg KOH/g of sample. The final hydroxyl value was measured to be 148.7 mg KOH/g of sample.

Subsequently, in a 1 L reaction flask equipped with a dry air sparge, agitation, a condenser and a drop funnel, 228 g IPDI was charged to said flask and warmed to 70° C. To this, 133 g of hydroxy ethyl methacrylate was added slowly to control exotherm. Finally, 359 g of the reaction product in the previous paragraph as well as 80 g of diethylene glycol dimethacrylate (DEGDMA) was added. The reaction was allowed to proceed to completion under agitation and heat.

To a 1 L reaction flask equipped with nitrogen blanket, agitation, temperature control and a condenser, 977 g of DCPD and 140 g of water were charged and warmed to 80° C. To this 725 g of maleic anhydride was added slowly in order to control exotherm under 125° C. Once all maleic was added, 860 g of trimethylol propane was added and heated to 205° C. The reaction was held until the acid value was measured to be 11.5 mg KOH/g of sample. Subsequently, the reactor was cooled to 120° C. and 128 g glycidyl neodecanoate was added. The reactor was help at 120° C. until the acid value was 1.5 mg KOH/g of sample. The final hydroxyl value was measured to be 142.8 mg KOH/g of sample.

Subsequently, in a 2 L reaction flask equipped with a dry air sparge, agitation, a condenser and a drop funnel, 293 g IPDI was charged to said flask and warmed to 70° C. To this, 153 g of hydroxy ethyl acrylate was added slowly to control exotherm. Finally, 464 g of the reaction product in the previous paragraph as well as 390 g of isobornyl acrylate were added. The reaction was allowed to proceed to completion under agitation and heat.

Example 4

Mixing of Coating Composition Containing Dicyclopentadiene Modified Ester Urethane Oligomers In a mixing cup, the urethane dicyclopentadiene oligomer was warmed to 60° C. with the appropriate monomer(s). The mixture was then stirred with mechanical agitation until homogenous. If necessary, the entire mixture was re-warmed and re-agitated until 100% homogeneous.

Example 5

Testing of Coating Compositions

TABLE 1

Experimental results of coatings applied to metal panels and cured via oxidative curing.

|  | Mandrel Bend Test (cm) | Impact Resistance Test (in-lbs) | | Koenig Hardness Test (seconds) | Cross Hatch Adhesion Test |
| --- | --- | --- | --- | --- | --- |
|  |  | Intrusion | Extrusion |  |  |
| Sample 1 | 3 | 6 | <6 | 144 | 1 |
| Sample 2 | 3 | 25 | <6 | 106 | 4 |
| Sample 3 | 3 | 6 | <6 | 110 | 5 |
| Sample 4 | 3 | 15 | <6 | 100 | 5 |

Mandrel Bend Test scoring: 3 to 24, where 3 is no coating delamination and 24 is total coating delamination; measured according to ASTM D522.
Impact Resistance Test measure according to ASTM D2794.
Koenig Hardness Test was measured using ASTM D4366.
Cross Hatch Adhesion Test scoring: 1 to 5, where 1 is total coating delamination and 5 is no coating delamination; measured according to ASTM D3359.

TABLE 2

Compositions of coating samples applied to metal panels and cured via oxidative curing.

|  | Sample 1 | Sample 2 | Sample 3 | Sample 4 |
| --- | --- | --- | --- | --- |
| DMEO (percentage) | 70 | 100 | 70 | 50 |
| Ethylenically unsaturated monomer 1 (percentage) | 30 |  |  |  |
| Ethylenically unsaturated monomer 2 (percentage) | 30 |  |  |  |
| Alkyd resin (percentage) |  |  |  | 50 |
| Cobalt (parts per hundred) | 0.44 | 0.44 | 0.44 | 0.44 |
| Zirconium (parts per hundred) | 0.44 | 0.44 | 0.44 | 0.44 |

TABLE 2-continued

Compositions of coating samples applied to metal panels and cured via oxidative curing.

|  | Sample 1 | Sample 2 | Sample 3 | Sample 4 |
|---|---|---|---|---|
| Calcium (parts per hundred) | 1.32 | 1.32 | 1.32 | 1.32 |
| Solvent 1 (parts per hundred) | 25 | 25 | 25 | 25 |
| Solvent 2 (parts per hundred) | 25 | 25 | 25 | 25 |

Ethylenically unsaturated monomer 1 is DEGDMA.
Ethylenically unsaturated monomer 2 is Miramer 5C6641 (Miwon North America, Exton, Pennsylvania, USA).
Alkyd resin is Deltech 440-50M (Deltech Corporation, Baton Rouge, Louisiana, USA).
Solvent 1 is toluene.
Solvent 2 is methyl ethyl ketone.

TABLE 3

Experimental results of coatings applied to metal panels and cured via oxidative curing.

|  | Creep Test (mean creep from scribe in mm) | Field Rust Test | Blister Size Test | Blister Density Test |
|---|---|---|---|---|
| Sample 5 | 4 | 10 | 0 | 0 |
| Sample 6 | 4 | 10 | 0 | 0 |
| Sample 7 | <1 | 10 | 0 | 0 |
| Sample 8 | <1 | 10 | 0 | 0 |
| Sample 9 | 3 | 10 | 0 | 0 |
| Sample 10 | 2 | 10 | 0 | 0 |

Field Rust Test scoring: 0 to 10, where 0 is greater than 50% rust and 10 is less than 0.01% rust; measured according to ASTM B117.
Blister Size Test scoring: 2 to 8, where 2 is the largest size blister and 8 is the smallest size blister; 0 indicates no blister; measured according to ASTM B117.
Blister Density Test scoring: 0 to 4, where 0 is no blisters and 4 is dense blisters; measured according to ASTM B117.

TABLE 4

Compositions of coatings applied to metal panels and cured via oxidative methods

|  | Sample 5 | Sample 6 | Sample 7 | Sample 8 | Sample 9 | Sample 10 |
|---|---|---|---|---|---|---|
| DMEO (percentage) | 70 | 35 | 70 | 70 | 70 |  |
| DMEUO (percentage) |  | 35 |  |  |  |  |
| Ethylenically unsaturated monomer 3 (percentage) | 30 | 30 |  |  | 15 |  |
| Ethylenically unsaturated monomer 4 (percentage) |  |  | 30 |  | 15 |  |
| Ethylenically unsaturated monomer 5 (percentage) |  |  |  | 30 |  |  |
| Alkyd resin (percentage) |  |  |  |  |  | 100 |
| Cobalt (parts per hundred) | 0.44 | 0.44 | 0.44 | 0.44 | 0.44 | 0.44 |
| Zirconium (parts per hundred) | 0.44 | 0.44 | 0.44 | 0.44 | 0.44 | 0.44 |
| Calcium (parts per hundred) | 1.32 | 1.32 | 1.32 | 1.32 | 1.32 | 1.32 |
| Silicone (drops) | 4 | 4 | 4 | 4 | 4 | 4 |
| Solvent 1 (parts per hundred) | 10 | 10 | 10 | 10 | 10 | 10 |
| Solvent 2 (parts per hundred) | 10 | 10 | 10 | 10 | 10 | 10 |

Ethylenically unsaturated monomer 3 is triethylene glycol dimethacrylate.
Ethylenically unsaturated monomer 4 is trimethyol propane triacrylate.
Ethylenically unsaturated monomer 5 is trimethylol prpane trimethacrylate.
Alkyd resin is Deltech 440-50M.
Solvent 1 is toluene.
Solvent 2 is methyl ethyl ketone.

What is claimed is:

1. A dicyclopentadiene modified ester oligomer of formula (I), wherein R is a hydrocarbon group comprising 1 to 20 carbon atoms, R' is a hydrocarbon group comprising 1 to 20 carbon atoms, R" is a hydrocarbon group comprising 1 to 20 carbon atoms, and x is H or $CH_3$

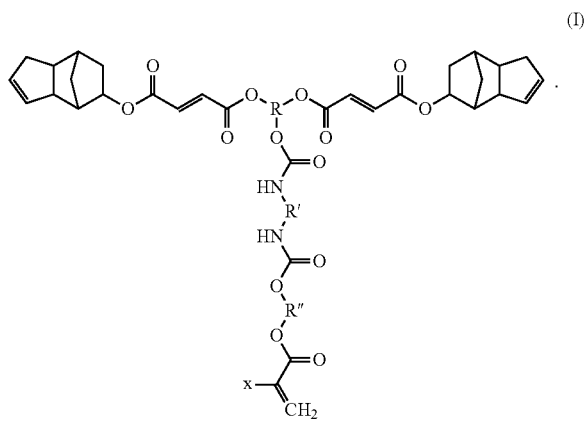

2. The dicyclopentadiene modified ester oligomer of claim 1, wherein R comprises 6 carbon atoms, R' comprises 10 carbon atoms, R" comprises 2 carbon atoms, and x is H.

3. The dicyclopentadiene modified ester oligomer of claim 1, wherein R comprises 6 carbon atoms, R' comprises 10 carbon atoms, R" comprises 2 carbon atoms, and x is $CH_3$.

4. A coating composition, comprising the dicyclopentadiene modified ester oligomer of claim 2 and at least one ethylenically unsaturated monomer.

5. A coating composition, comprising the dicyclopentadiene modified ester oligomer of claim 3 and at least one ethylenically unsaturated monomer.

6. The coating composition of claim 4, wherein said at least one ethylenically unsaturated monomer is selected from the group consisting of trimethylolpropane trimethacrylate (TMPTMA); trimethylolpropane triacrylate (TMPTA); triethyleneglycol dimethacrylate (TRGDMA); and monoacryloxyethyl succinate (MAES).

7. The coating composition of claim 5, wherein said at least one ethylenically unsaturated monomer is selected from the group consisting of trimethylolpropane trimethacrylate (TMPTMA); trimethylolpropane triacrylate (TMPTA); triethyleneglycol dimethacrylate (TRGDMA); neopentyl glycol, propoxylated (2 mol), diacrylate (NPGO2DA); tripropylene glycol diacrylate (TPGDA); and monoacryloxyethyl succinate (MAES).

8. The coating composition of claim 6, further comprising a metal drier.

9. The coating composition of claim 7, further comprising a metal drier.

10. The coating composition of claim 8, wherein said coating composition is curable to a surface by at least one of oxidative curing and thermal curing.

11. The coating composition of claim 9, wherein said coating composition is curable to a surface by at least one of oxidative curing and thermal curing.

* * * * *